US008105010B2

(12) United States Patent
Van De Klippe

(10) Patent No.: US 8,105,010 B2
(45) Date of Patent: Jan. 31, 2012

(54) WIND ENERGY CONVERSION APPARATUS

(75) Inventor: Frederikus Van De Klippe, Eindhoven (NL)

(73) Assignee: Wind en Water Technologie Holding B.V., Schoondijke (NL)

(*) Notice: Subject to any disclaimer, the term of this patent is extended or adjusted under 35 U.S.C. 154(b) by 0 days.

(21) Appl. No.: 12/591,269

(22) Filed: Nov. 13, 2009

(65) Prior Publication Data

US 2010/0158692 A1 Jun. 24, 2010

Related U.S. Application Data

(63) Continuation of application No. 10/542,428, filed as application No. PCT/NL2004/000032 on Jan. 14, 2004, now abandoned.

(30) Foreign Application Priority Data

Jan. 15, 2003 (NL) ...................................... 1022393

(51) Int. Cl.
*F03D 7/02* (2006.01)

(52) U.S. Cl. ..................... 415/4.3; 416/175; 416/132 B; 416/132 A

(58) Field of Classification Search ................... 415/4.1, 415/4.3, 4.5; 416/175, 197 A, 227 R, 227 A, 416/223 R, 237
See application file for complete search history.

(56) References Cited

U.S. PATENT DOCUMENTS

| 527,866 | A | 10/1894 | Lutnes ............................ 416/13 |
| 2,020,900 | A | 11/1935 | Methvin .......................... 170/10 |
| 3,918,839 | A | 11/1975 | Blackwell et al. ............. 416/175 |
| 4,012,163 | A | 3/1977 | Baumgartner et al. ..... 415/208.3 |
| 4,543,042 | A | 9/1985 | Lange ....................... 416/197 A |
| 5,269,647 | A | 12/1993 | Moser ............................ 415/2.1 |

FOREIGN PATENT DOCUMENTS

| DE | 3331166 A1 | 3/1985 |
| DE | 3919157 A1 | 12/1989 |
| FR | 646431 | 12/1927 |
| FR | 2609506 | 7/1988 |
| JP | 57070961 A | 5/1982 |

*Primary Examiner* — Edward Look
*Assistant Examiner* — Dwayne J White
(74) *Attorney, Agent, or Firm* — Jacobson Holman PLLC

(57) ABSTRACT

A wind energy conversion apparatus includes a supporting structure. The apparatus further includes a shaft having a first and a second end, which is rotatably journalized in the supporting structure, as well as at least one rotor blade having a first end and a second end, which rotor blade is mounted on the shaft with both ends.

14 Claims, 4 Drawing Sheets

WIND ENERGY CONVERSION APPARATUS

This application is a Continuation of U.S. Pat. application Ser. No. 10/542,428, filed Jan. 9, 2006, now abandoned which is a National Stage filing of PCT/NL2004/000032 filed Jan. 14, 2004, which claims priority to The Netherlands 1022393 filed Jan. 15, 2003, all of which are incorporated by reference herein.

FIELD OF THE INVENTION

The invention relates to a wind energy conversion apparatus comprising a supporting structure; a shaft having a first and a second end, which is rotatably journalled in said supporting structure, as well as at least one rotor blade having a first end and a second end, which rotor blade is mounted on said shaft with both ends.

The invention also relates to a rotor blade for use in such wind energy conversion apparatus.

BACKGROUND OF THE INVENTION

Wind energy conversion apparatuses of the kind referred to above are already known from German patent publication No. 3331166 A. The horizontal shaft thereby extends in the direction of the oncoming wind, all this in such a manner that the plane of inflow of said wind capturing means extends substantially perpendicularly to the main shaft and also substantially perpendicularly to the direction of the oncoming wind.

For a long time already people have attempted to convert an increasing amount of wind energy into other forms of energy. It is known that this can be achieved by enlarging the area that is covered by the rotating rotor blade. This enlargement can be accomplished by using rotor blades having a greater length. Such longer rotor blades are expensive as regards their construction, however, because they must also be capable of taking up flexural stress induced by the wind and by gyroscopic effects. The length of such a rotor blade is limited by the large mechanical forces to which such long rotor blades are subjected. In addition, such long rotor blades cause the noise level to increase, which renders the use of such wind turbines in built-up areas less desirable.

SUMMARY OF THE INVENTION

The object of the invention is to improve the known apparatus and to provide a wind energy conversion apparatus which, given the same dimensions and the same wind conditions, is capable of converting a larger amount of wind energy into other forms of energy. In order to accomplish that objective, the wind energy conversion apparatus according to the invention is characterized in that the rotor blade is provided with additional wind capturing means.

As a result of the special construction of the rotor blade that is used in the apparatus, the windward side of the rotor blade, in addition to exerting a force in the direction of the air flow, also exerts a force on the air flow in radial direction, which results in a Venturi effect. Said Venturi effect leads to an increased flow of air through the rotor, enabling the wind energy conversion apparatus according to the invention to draw more energy from the air flowing through the apparatus. This results in the significantly improved efficiency of the apparatus according to the invention.

The wind capturing means may consist of a widened portion of the rotor blade, which widened portion is circular in shape in one embodiment and ellipsoidal in shape in another embodiment. It has become apparent that the Venturi effect is enhanced when the rotor blade is provided with additional wind capturing means as explained above. As a result, even more air will flow through the area covered by the rotor blade, so that the wind energy conversion apparatus can draw energy from the wind in a more efficient manner.

Such a wind conversion apparatus according to the invention is thus characterized by its simple but nevertheless robust construction, since the rotor blade is only subjected to tensile stress during operation when this construction is used. Since the rotor blade does not have a tip, in contrast to the known windmills or wind turbines, the noise production of a wind energy conversion apparatus according to the invention is furthermore significantly lower than that of the current apparatus. This renders the wind energy conversion apparatus according to the invention quite suitable for use in built-up areas.

More in particular, the two ends of the rotor blade are according to the invention mounted some distance apart on the shaft.

It has been established by experiment that the wind energy conversion apparatus according to the invention is very effective in drawing energy from the air flowing through and around the apparatus when the spacing between the two ends equals about twice the radius of the rotor blade.

In a specific embodiment of the invention, the rotor blade is elongate in shape, in a special embodiment it is embodied as a thin, flat plate.

According to the invention, the rotor blade is made of a metal or of a synthetic fibre material. In combination with the configuration of the rotor blade as a thin, flat plate, the rotor blade according to the invention can be mass-produced at low cost in a quick and simple manner. Since the cost price of a wind energy conversion apparatus is to a large extent determined by the construction costs of the rotor blade, the wind energy conversion apparatus according to the invention can in addition be produced at significantly lower cost due to said significant reduction of the manufacturing costs of rotor blades according to the invention. This offers greater possibilities of installing relatively small wind energy conversion apparatuses according to the invention in built-up-up areas, for example on the property of private individuals, so that the acceptation level of such a wind energy conversion apparatus will be considerably higher.

In a very specific embodiment, the wind energy conversion apparatus according to the invention comprises two or more rotor blades mounted on the shaft, which rotor blades describe mutually different diameters.

In one embodiment of the apparatus, the two ends of the rotor blade are each mounted near a corresponding end of the shaft, with the shaft being mounted in bearings in the supporting structure with both its ends. This construction makes it possible to obtain an efficient rotor (a horizontal shaft with one or more rotor blades mounted thereon) while using a compact construction, which rotor draws energy from the air flowing through and around the apparatus in a very efficient manner.

According to the invention, in order to achieve an effective conversion of the wind energy into electrical energy, the shaft is coupled with means, such as a generator, for converting rotational energy into electrical energy. Said generator may be mounted in or on the bearing-mounted shaft.

The invention also relates to a rotor blade according to the invention as described in the description of the figures and as shown in the drawings.

BRIEF DESCRIPTION OF THE DRAWINGS

The invention will now be explained in more detail with reference to the drawings, in which.

DETAILED DESCRIPTION OF THE PREFERRED EMBODIMENTS

A prior art wind energy conversion apparatus according to the invention will now. be described with reference to FIG. 1. For the sake of completeness, corresponding parts are indicated by the same numerals.

Figure 1:
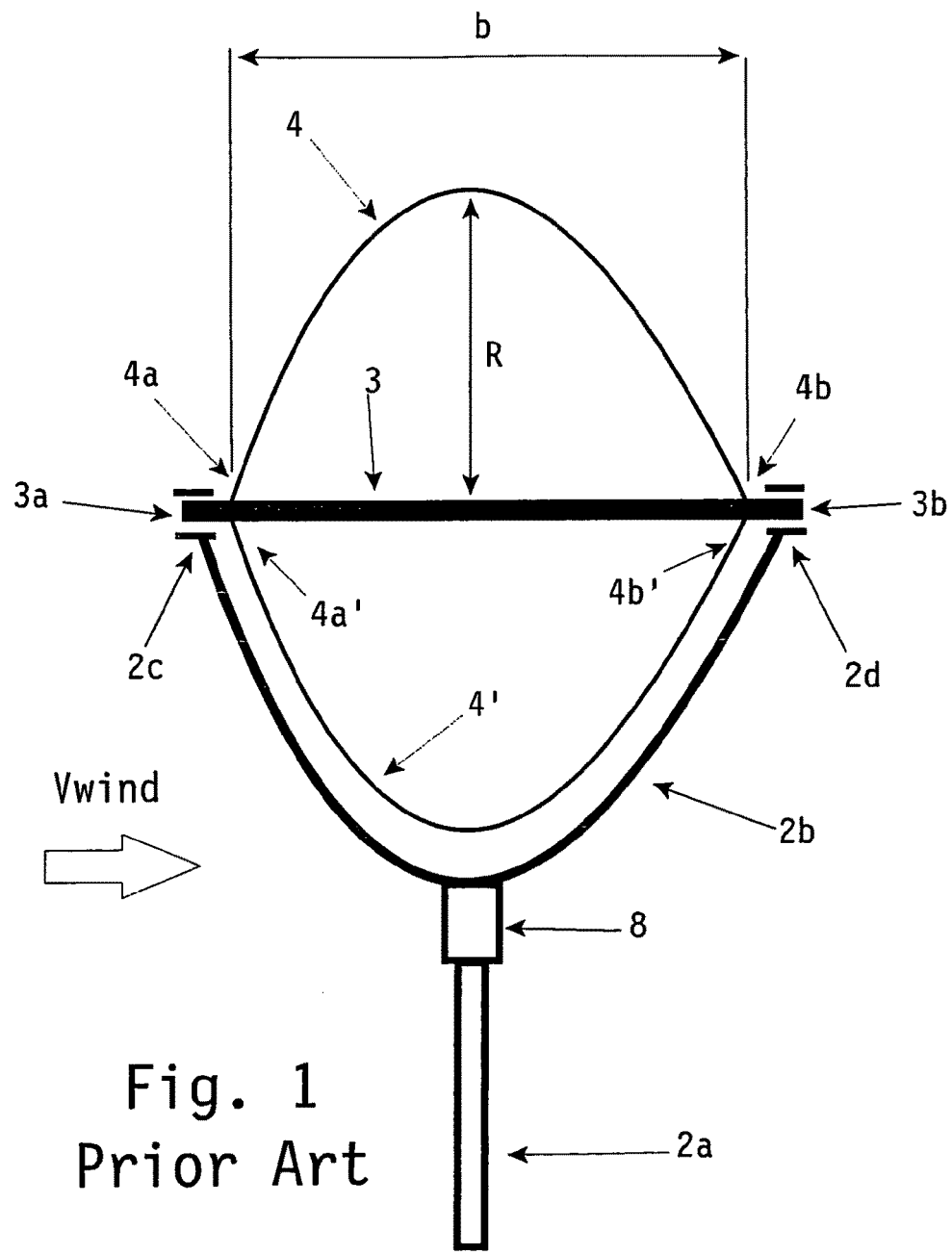
FIG. 1 schematically shows an embodiment of a prior art wind energy conversion apparatus.

The wind energy conversion apparatus 1 that is shown in FIG. 1 comprises a vertical column 2a, on which a supporting structure 2b is mounted. In the supporting structure 2b, a horizontal shaft 3 is rotatably accommodated with its first end 3a and its second end 3b in bearings 2c and 2d, respectively, which form part of the supporting structure 2b. The wind energy conversion apparatus 1 is provided with one rotor blade, two rotor blades 4-4' in this embodiment, which rotor blades 4-4' are fixedly connected to the horizontal shaft 3 with their first end 4a-4a' and their second end 4b-4b'.

An angular displacement in the two ends of the rotor blade of the wind energy conversion apparatus Will cause the apparatus to start rotating of its own accord, i.e, no additional energy source is required for setting the rotor blades in motion, after which the wind will take over the rotor blade drive. Furthermore, the wind energy conversion apparatus aligns itself with the oncoming wind, because the rotor functions as a windvane during rotation. The supporting structure 2b is rotatably mounted on the vertical column 2a by means of a rotation bearing 8.

Preferably, a windvane is mounted, so that the wind energy conversion apparatus will align itself with the wind even at very low wind velocities. Thus, the wind energy conversion apparatus as shown in FIG. 1 will invariably align itself with the wind in such a manner that the horizontal shaft 3 will extend in the direction of the wind at all times, as is indicated by the arrow in FIG. 1.

As is shown in FIG. 1, the two ends 4a-4a' and 4b-4b', respectively, of the rotor blades 4-4' are according to the invention mounted on the horizontal shaft 3 with a spacing b between them; in a specific embodiment, the spacing b between the two ends 4a-4a' and 4b-4b', respectively, of the rotor blades 4-4' amounts to less than twice the radius R of each rotor blade 4-4'.

In another embodiment, said spacing b may amount to twice the radius R, and in yet another embodiment said spacing 2b may amount to more than twice the radius R of the rotor blade 4-4'. Twice the radius R of the rotor blade corresponds to the diameter D that the rotor blade describes in the air during operation.

As is clearly shown in FIG. 1, the two ends 4a-4a' and 4b-4b', respectively, of the rotor blades 4-4' are disposed near the first end 3a and the second end 3b, respectively, of the horizontal shaft 3.

Figure 2A:
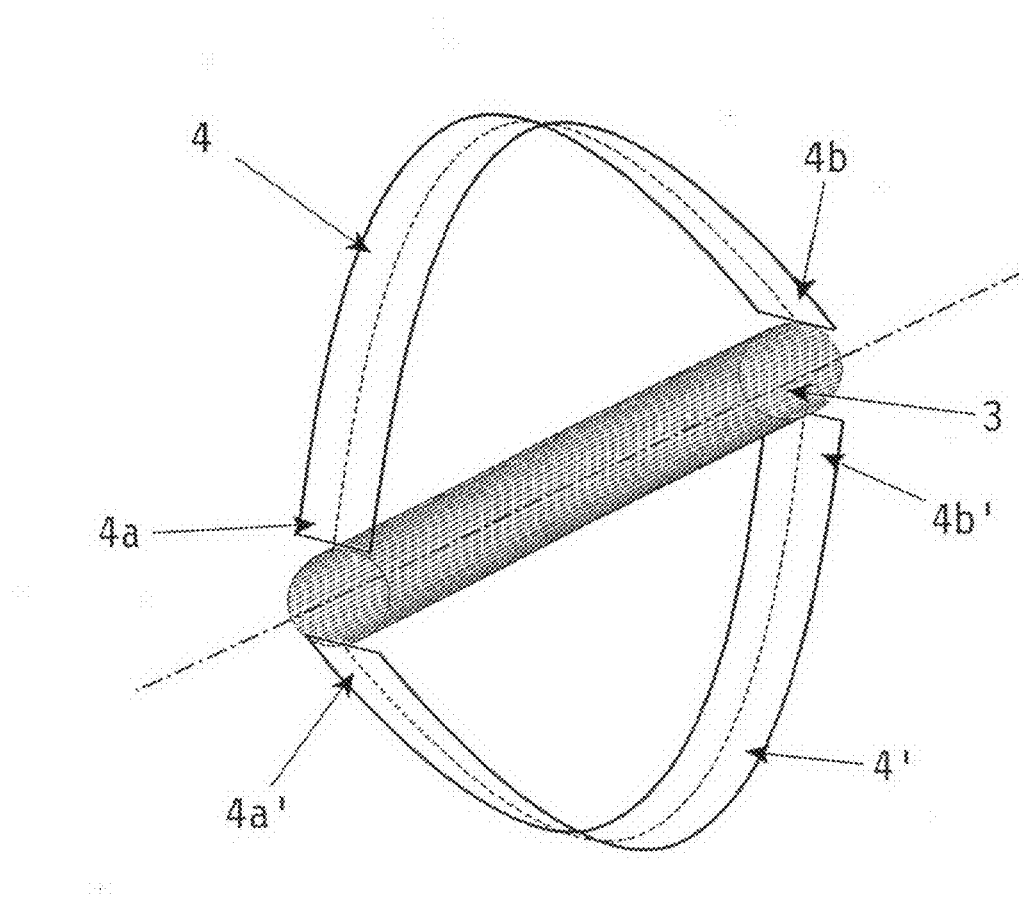
FIGS. 2A-2B is a detail view of the wind energy conversion apparatus that is shown in FIG. 1.
Figure 2B:
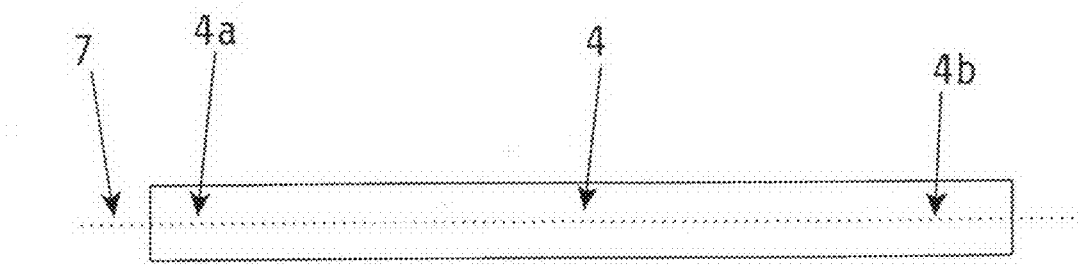

As a result of the relatively simple construction of the wind energy conversion apparatus according to FIG. 1, the only stress that occurs in the rotor blades 4-4' once the wind has set the rotors going is tensile stress, which makes it possible to use a simple construction for the rotor blades 4-4'. In this embodiment according to the invention, the rotor blades 4-4' (see FIG. 2a and FIG. 2b) are embodied as a thin, flat plate. More specifically, the plate-shaped rotor blades are furthermore flexible as regards its shape, so that they will automatically assume their desired shape, owing to the occurrence of centrifugal forces, during rotation of the horizontal shaft 3. Said shape, also called chain line, ensures that only tensile stress will occur in the rotor blade and that consequently the stress at the two ends 3a and 3b, respectively, of the shaft 3 will be minimal, which enables a further simplification of the construction.

Figure 3A:
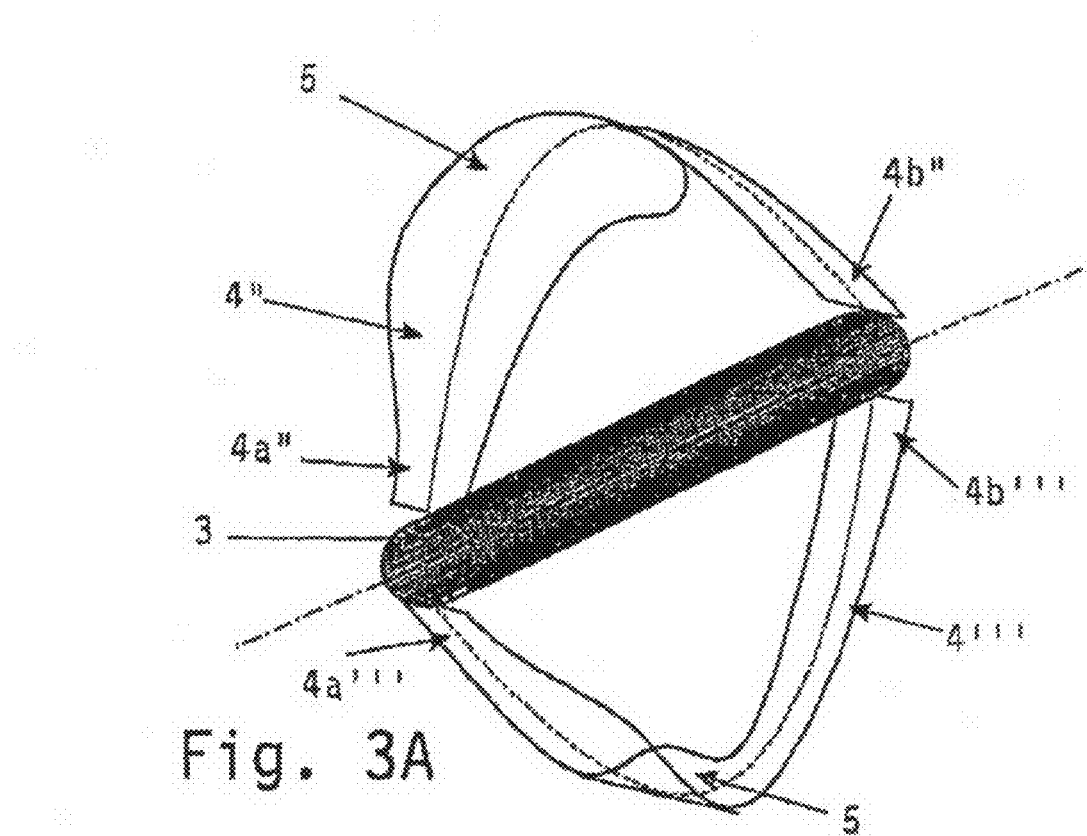
FIGS. 3A-3B show an embodiment of a rotor blade for use in a wind energy conversion apparatus according to the invention.
Figure 3B:
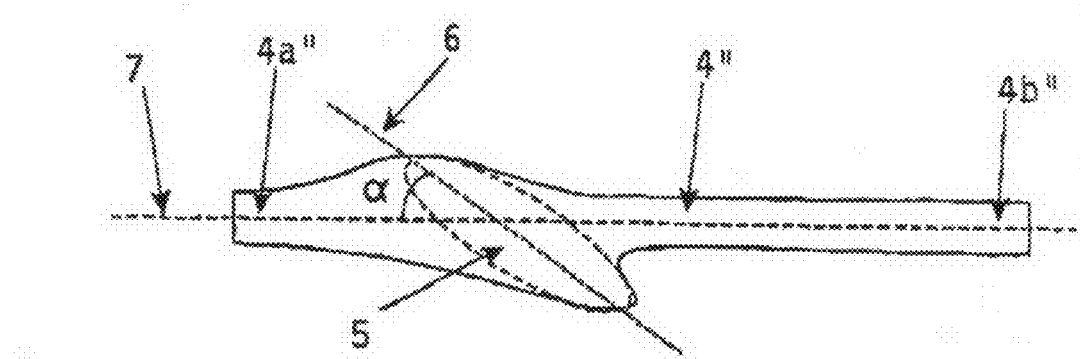

FIGS. 3a and 3b show another embodiment of the invention. This embodiment makes use of rotor blades 4"-4'" of different shape, which rotor blades are likewise mounted on the horizontal shaft 3 with their first and second ends. More specifically, the rotor blades 4"-4'" are provided with additional wind capturing means 5, which preferably consist of a widened portion of the rotor blade 4"-4'".

In a specific embodiment, the widened portion of the rotor blade, which functions as a wind capturing means, is circular in shape; in the embodiment that is shown In FIGS. 3a-3b. the widened portion of each rotor blade 4"-4'" functioning as a wind capturing means 5 is ellipsoidal in shape. The first main shaft 6 of the ellipsoidal wind capturing means 5 may thereby coincide with the longitudinal axis 7 of the rotor blade 4"; however, in order to obtain a strongly improved efficiency of the wind energy conversion apparatus, the first main shaft 6 includes an angle a with the longitudinal axis 7 of the rotor blade, which angle preferably ranges between 0° and 60°, more in particular between 20° and 40°.

As FIG. 3b shows, the widened portion 5 that functions as a wind capturing means does not form an ellipsoid in a geometric sense, but the ellipsoid 5 more or less smoothly merges with the outer circumference of the strip-shaped rotor or blade 4".

Figure 4:
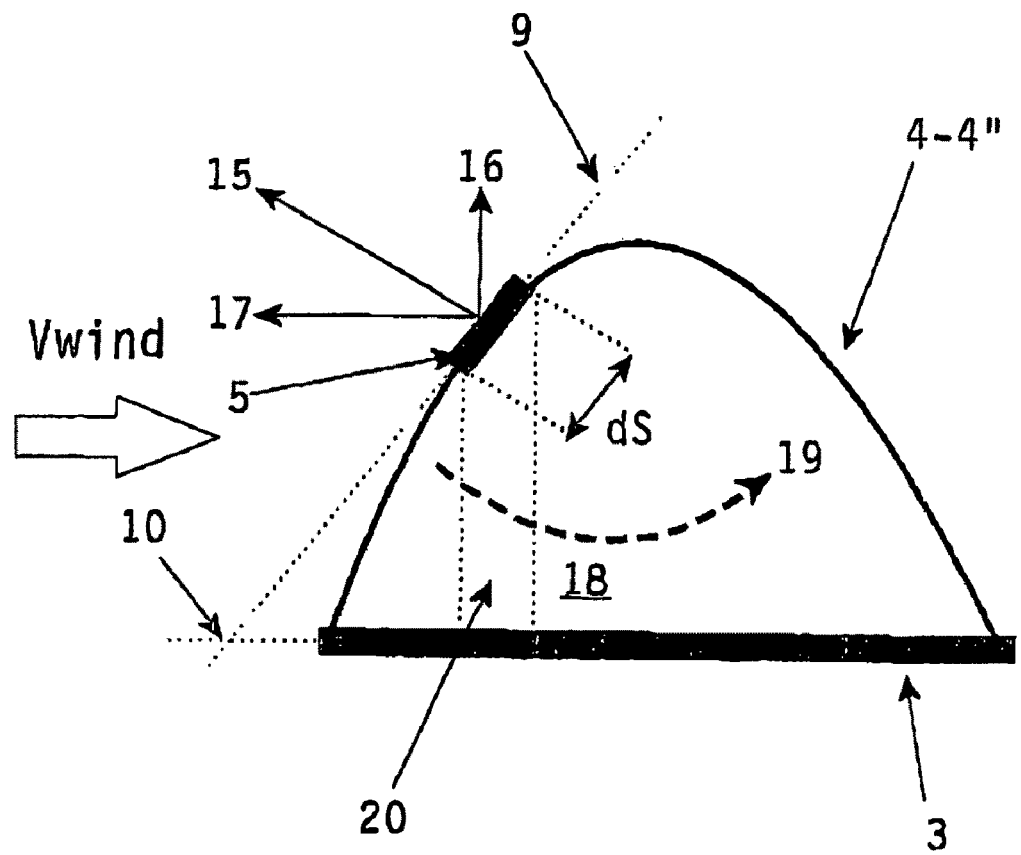
FIG. 4 shows a second embodiment of a wind energy conversion apparatus according to the invention.

As a result of a suitable integration of the wind capturing means 5 in each rotor blade (seen in the wind direction $V_{wind}$), any segment dS moves along the path described by the circumferential surface of a truncated cone, as is shown in FIG. 4, wherein the plane of inflow 9 of the wind capturing means 5 intersects the horizontal shaft 3 at an upstream position 10, seen in the direction of the oncoming wind $V_{wind}$. During rotation of the rotor blades by the oncoming wind $V_{wind}$, the wind reaction force 15 of the rotor 4" extends perpendicularly to the plane of inflow 9 of the wind capturing means 5. Said force 15 can be resolved into a force 16 acting in a direction parallel to the horizontal shaft 3 and a force 17 acting in the radial plane of the supporting structure.

Said radial force 17 will create an underpressure in the region 18 surrounding the horizontal shaft 3, and furthermore said force 17 will carry air radially outwards downstream thereof, as is indicated by the arrow 19. As a result of the presence of the underpressure in the region 18, the air flow will contract, causing the mass flow of the air through the entire apparatus and through the area of the rotors 4" to increase. This in turn results in more energy being drawn from the air flow, which leads to a significantly improved efficiency of such wind energy conversion apparatuses.

The aforesaid effect of contraction of the oncoming air through the rotating rotor blades 4" can be compared with the phenomenon that occurs in the converging portion of a Venturi tube.

As a result of the inclined position of the wind capturing means 5 on the rotor blades 4", a conical surface 20 is covered during rotation, which acts as the throat or constriction of Venturi tubes.

More in particular, the rotor blades according to the invention may be made of a metal or of a plastic material.

Although two rotor blades 4-4' are mounted on the horizontal shaft 3 in FIG. 1, is also possible to use only one rotor blade. It is also possible, on the other hand, to use more than two rotor blades, and in the situation in which several rotor blades are mounted on the same horizontal shaft, said rotor blades may have mutually different radii. The wind energy conversion apparatus according to the invention is characterized by a simple and light construction, which makes the wind energy conversion very suitable for use in areas not covered by the electricity grid.

Since only tensile stress, no flexural stress, occurs in the rotor blade, the wind energy conversion apparatuses is characterized by its light and simple construction. Since the aerodynamic angle of incidence of the wind $V_{wind}$ is furthermore constant (or at least not variable), and an actual rotor blade tip is missing, the wind energy conversion apparatus according to the invention is characterized by a very low noise level. This latter characteristic makes it possible to install the apparatus in built-up areas, whereas the noise level during operation of the wind energy conversion apparatuses that are currently known is generally too high to make installation thereof in built-up areas feasible.

The invention claimed is:

1. A wind energy conversion apparatus comprising:
   a supporting structure;
   a horizontal shaft having a first and a second end, said horizontal shaft being rotatably journalled in said supporting structure; and
   at least one rotor blade constructed as a, flat flexible plate and having a first end and a second end, said at least one rotor blade being mounted on said shaft with both ends, such that during use, said at least one rotor blade exhibits a rotating chain line configuration, and the rotor blade being provided with additional wind capturing means, the additional wind capturing means comprising an asymmetrically positioned widened portion of the rotor blade.

2. The wind energy conversion apparatus according to claim 1, wherein the widened portion has an ellipsoid merged therein.

3. The wind energy conversion apparatus according to claim 2, wherein a main axis of the ellipsoid coincides with a longitudinal axis of the blade.

4. The wind energy conversion apparatus according to claim 2, wherein a main axis of the ellipsoid has an angle with a longitudinal axis of the blade.

5. The wind energy conversion apparatus according to claim 3, wherein the angle is in the range of 0° to 60°.

6. The wind energy conversion apparatus according to claim 4, wherein the angle is in the range of 20° to 40°.

7. The wind energy conversion apparatus according to claim 1, wherein the widened portion is circlular in shape.

8. A rotor blade for a wind energy conversion apparatus according to claim 1, wherein the rotor blade is flexible and mountable on a rotatable horizontal shaft of the wind energy conversion apparatus by two ends of the rotor blade, said rotor blade being capable of rotating and exhibiting a rotating chain line configuration and the rotor blade being provided with additional wind capturing means, the additional wind capturing means comprising an asymmetrically positioned widened portion of the rotor blade.

9. The rotor blade according to claim 8, wherein the widened portion portion has an ellipsoid merged therein.

10. The rotor blade according to claim 8, wherein a main axis of the ellipsoid coincides with a longitudinal axis of the blade.

11. The rotor blade according to claim 8, wherein a main axis of the ellipsoid has an angle with a longitudinal axis of the blade.

12. The rotor blade according to claim 11, wherein the angle is in the range of 0° to 60°.

13. The rotor blade according to claim 12, wherein the angle is in the range of 20° to 40°.

14. The rotor blade according to claim 8, wherein the widened portion is circlular in shape.

* * * * *